(12) United States Patent
Stanley

(10) Patent No.: US 11,364,592 B2
(45) Date of Patent: Jun. 21, 2022

(54) SHARPENING APPARATUS AND METHOD OF MAKING

(71) Applicant: HMS Enterprises, INC., Pepperell, MA (US)

(72) Inventor: Harrelson M Stanley, Pepperell, MA (US)

(73) Assignee: HMS Enterprises, Inc., Pepperell, MA (US)

( * ) Notice: Subject to any disclaimer, the term of this patent is extended or adjusted under 35 U.S.C. 154(b) by 479 days.

(21) Appl. No.: 16/688,402

(22) Filed: Nov. 19, 2019

(65) Prior Publication Data

US 2021/0146503 A1     May 20, 2021

(51) Int. Cl.
| | |
|---|---|
| *B24D 15/06* | (2006.01) |
| *B33Y 10/00* | (2015.01) |
| *B33Y 70/00* | (2020.01) |
| *B33Y 80/00* | (2015.01) |
| *B24D 18/00* | (2006.01) |
| *B29C 64/118* | (2017.01) |
| *B29K 509/02* | (2006.01) |
| *B29K 67/00* | (2006.01) |
| *B29K 21/00* | (2006.01) |

(52) U.S. Cl.
CPC ......... *B24D 15/06* (2013.01); *B24D 18/0063* (2013.01); *B29C 64/118* (2017.08); *B33Y 10/00* (2014.12); *B33Y 70/00* (2014.12); *B33Y 80/00* (2014.12); *B29K 2021/003* (2013.01); *B29K 2067/046* (2013.01); *B29K 2509/02* (2013.01)

(58) Field of Classification Search
CPC ... B24D 15/06; B24D 18/0063; B29C 64/118; B33Y 10/00; B33Y 70/00; B33Y 80/00; B33Y 70/10; B29K 2021/003; B29K 2067/046; B29K 2509/02
See application file for complete search history.

(56) References Cited

U.S. PATENT DOCUMENTS

| | | | |
|---|---|---|---|
| 9,844,853 B2 * | 12/2017 | Pacella | B24D 7/02 |
| 10,254,499 B1 * | 4/2019 | Cohen | B23K 1/0056 |
| 11,225,026 B2 * | 1/2022 | Georgeson | B29C 64/118 |
| 11,269,311 B2 * | 3/2022 | Teng | B33Y 50/02 |
| 11,318,564 * | 5/2022 | Ma | B22F 12/90 |
| 2020/0070311 A1 * | 3/2020 | Smithson | B24D 3/20 |

* cited by examiner

*Primary Examiner* — Nahida Sultana
(74) *Attorney, Agent, or Firm* — Hayes Soloway PC

(57) ABSTRACT

The present invention is a three dimensionally printed sharpening tool with diamond abrasive and method of making. The diamond-polymer resin composite tool is shapeable and personalizeable with printed imbedded logos for brand specific manufacturing which co-function as embedded dimension specific markers in multiple layers enabling a single tool to provide sharpening, lapping and polishing in a single operation.

10 Claims, 9 Drawing Sheets

SHARPENING APPARATUS AND METHOD OF MAKING

BACKGROUND OF THE INVENTION

1. Field of the Invention

The present invention relates generally to abrasive materials for the sharpening or honing of materials. Particularly, the present invention relates to abrasive materials sharpening or honing of materials metals for machine applications, medical devices, knives, blades, planers, and other cutting devices.

2. Description of the Prior Art

Abrasive materials, such as sharpening tools, are essential to the manufacture of precision devices. Sharpening tools are typically one of three types of materials; natural stones, manufactured ceramic blocks, and polymer composite blocks.

U.S. Pat. No. 8,349,041 (2013, Sankaranarayanan) discloses an abrasive article which includes an abrasive layer having an array of protrusions. The abrasive layer has a thickness not greater than about 500 mils. The abrasive article is free of a backing layer.

U.S. Pat. No. 6,261,167 (2001, Watson) discloses an abrasive tool which includes a first perforated sheet having a front surface and a back surface, and a second perforated sheet having a front surface and a back surface. A first layer of abrasive grains is bonded to the front surface of the first perforated sheet and a second layer of abrasive grains is bonded to the front surface of the second perforated sheet. A core is made of a first material, the core having a first surface and a second surface, the back surface of the first perforated sheet disposed adjacent to the first surface of the core and the back surface of the second perforated sheet disposed adjacent to the second surface of the core, the core being bonded to the first perforated sheet and the second perforated sheet by forming the core between the first perforated sheet and the second perforated sheet.

SUMMARY OF THE INVENTION

Advantages and Differences of Invention Over Known Prior Art

The abrasive materials should have the capability to facilitate both rapid material removal and high surface polishing as necessary, and sharp edges where appropriate.

Currently available sharpening tools have limitations with respect to shaping and reconditioning the tool surface over the useful life of the tool. For example, for natural stones, the work necessary in cutting, shaping, and polishing natural tools for use as abrasives for sharpening is both labor intensive and requires expensive diamond and metal composites.

The difficulty with ceramic composites that contain a variety of imbedded cutting abrasives is the requirement of high temperature firing and labor-intensive polishing procedures to be of use.

Difficulties with polymeric composites appear in the curing step as the composites often deform in the manufacture process. Even after manufacturing is completed, these polymeric composite tools tend to have a high wear rate when used to hone metals.

Diamond and metal composites, specifically, are widely available in the sharpening commercial space. However, in the application of sharpening and fine polishing of metals they have limited applicability. A major drawback of diamond/metal composites as a sharpening tool is their limited lifetimes. Once they deform, the diamond and metal composites cannot be easily resurfaced to give a sufficiently flat surface for fine sharpening and polishing.

For the reasons described above, and others, the above-described parts of the prior art have not proven fully satisfactory for meeting all the objectives of an abrasive sharpening tool for honing a tool or other cutting edge.

Objectives of the Present Invention

It is an objective of the present invention to provide a sharpening tool which meets and exceeds all of these objectives. Specifically, it is an objective of the present invention to provide a sharpening tool with an extended lifetime, capable of increased applicability. Another objective of the present invention to provide a sharpening tool having multiple layers so that the majority of the volume of the sharpening tool is not merely reduced to being a handle with a thin veneer of abrasive surface, but instead to have multiple abrasive surfaces to increase the overall life of the abrasive tool. It is a further object of the present invention to provide a sharpening tool capable of having multiple sharpening or honing edges.

It is yet another objective of the invention to provide a sharpening tool formed of a polymeric abrasive material with incorporated diamond. It is another objective to provide a sharpening tool capable of improving the sharpening rate of a resin based tool.

It is yet another objective of the invention to provide a simple method for preparing a polymeric abrasive material. Three-dimensional printing of a composite tool according to the present inventive method eliminates curing steps of the prior art which can lead to deformation in the manufacture process. Further, three-dimensional printing according to the present inventive method employs pre-made composites with abrasives of different dimensions in order to meet these goals.

A further objective is to provide a diamond composite sharpening material that can be easily resurfaced after deformation. The present inventive method meets this objective by providing a diamond/polymer composite which would be such an abrasive material that would give good material removal rates and could be continually resurfaced for a long functional lifetime.

It is yet another objective of the invention to provide three dimensionally printed sharpening plates with diamond abrasive; diamond-polymer resin composite tools which are 'shapeable' and can be printed in any three-dimensional configuration. Another objective is to provide diamond-polymer resin composite tools which can be printed with dimension specific markers to ensure flatness to the micron level; and diamond-polymer resin composite tools which can be printed with imbedded logos for brand specific manufacturing while providing a functional advantage over decorative counterparts.

The present invention achieves these and other objectives by providing a three dimensionally printed sharpening tool which has at least a first layer and a second layer. The first layer has a first plurality of filaments, and the second layer has a second plurality of filaments. Each of the first and second plurality of filaments having a vertically facing surface and an horizontally facing surface.

At least a portion of the horizontally facing surfaces of each of the first plurality of filaments abut against, and at least partially merge with, at least a portion of the horizontally facing surfaces of at least one other of the first plurality of filaments. Likewise, at least a portion of the horizontally facing surfaces of each of the second plurality of filaments abut against, and at least partially merge with, at least a portion of the horizontally facing surfaces of at least one other of the second plurality of filaments.

In addition to the interaction among the filaments of each plurality, the first and second pluralities of filaments interact among each other. Indeed, at least a portion of the vertically facing surfaces of each of the first plurality of filaments will abut against, and at least partially merge with, at least a portion of the vertically facing surfaces of at least one of the second plurality of filaments.

The first plurality of filaments are formed of a composite mixture of at least one of polylactic acid and thermoplastic elastomer, with at least one of an abrasive component, the abrasive component being chosen from the group consisting of diamond, cubic boron nitride, zirconia, aluminum oxide, sapphire, silicon carbide, and garnet. The size of this abrasive component is in a range from 250 microns to 0.01 microns.

The sharpening tool having at least one composite layer having at least one base layer, one component layer, and one overlayer. At least the component layer and the overlayer interacting vertically and horizontally, having complimentary shapes.

DETAILED DESCRIPTION OF THE INVENTION

Figure 1:
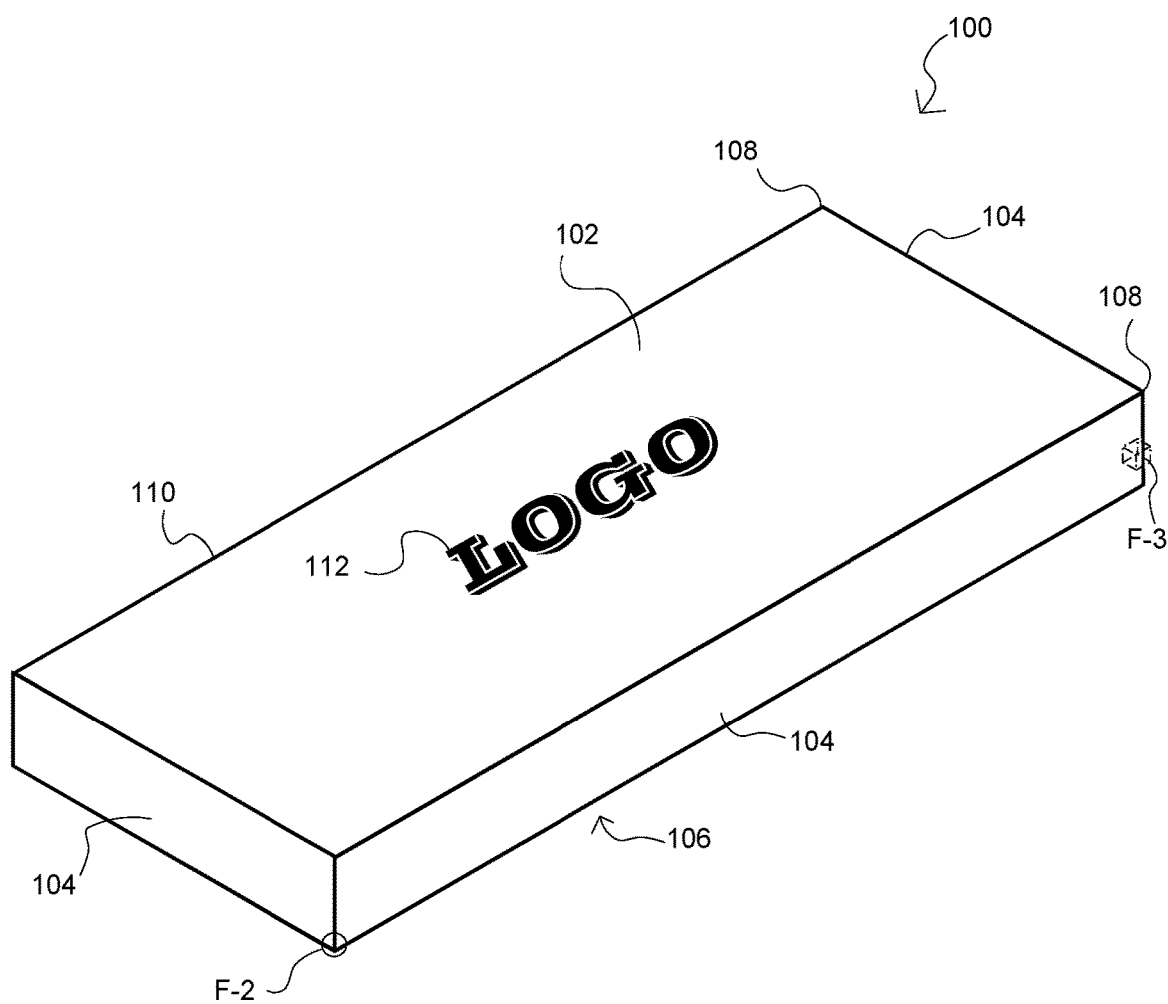
FIG. 1 is an upper left perspective view of one embodiment of a sharpening tool of the present invention.

The preferred embodiment of the present invention is illustrated in FIGS. 1-4. Specifically, FIG. 1 shows a personalized sharpening tool 100 which comprises layers of embedded structural matrices created according to an abrasive material management system of the present invention used to print abrasives structures on demand while maintaining surface control.

Specifically, FIG. 1 shows a perspective view of a sharpening tool 100 created according to the above methods of the present invention. This embodiment of a sharpening tool 100 has upper surface layer 102 with a logo 112. Four side walls 104 are perpendicularly extending between the upper surface 102 and the under surface 106 of the tool 100. In this embodiment, being of a generally rectangular outer shape, each of the four side walls 104 share edges 112 with two other of the side walls 104, and vertices 108 indicate the point at which at least two side walls meet a corner of an upper surface 102 or lower surface 106.

Figure 2:
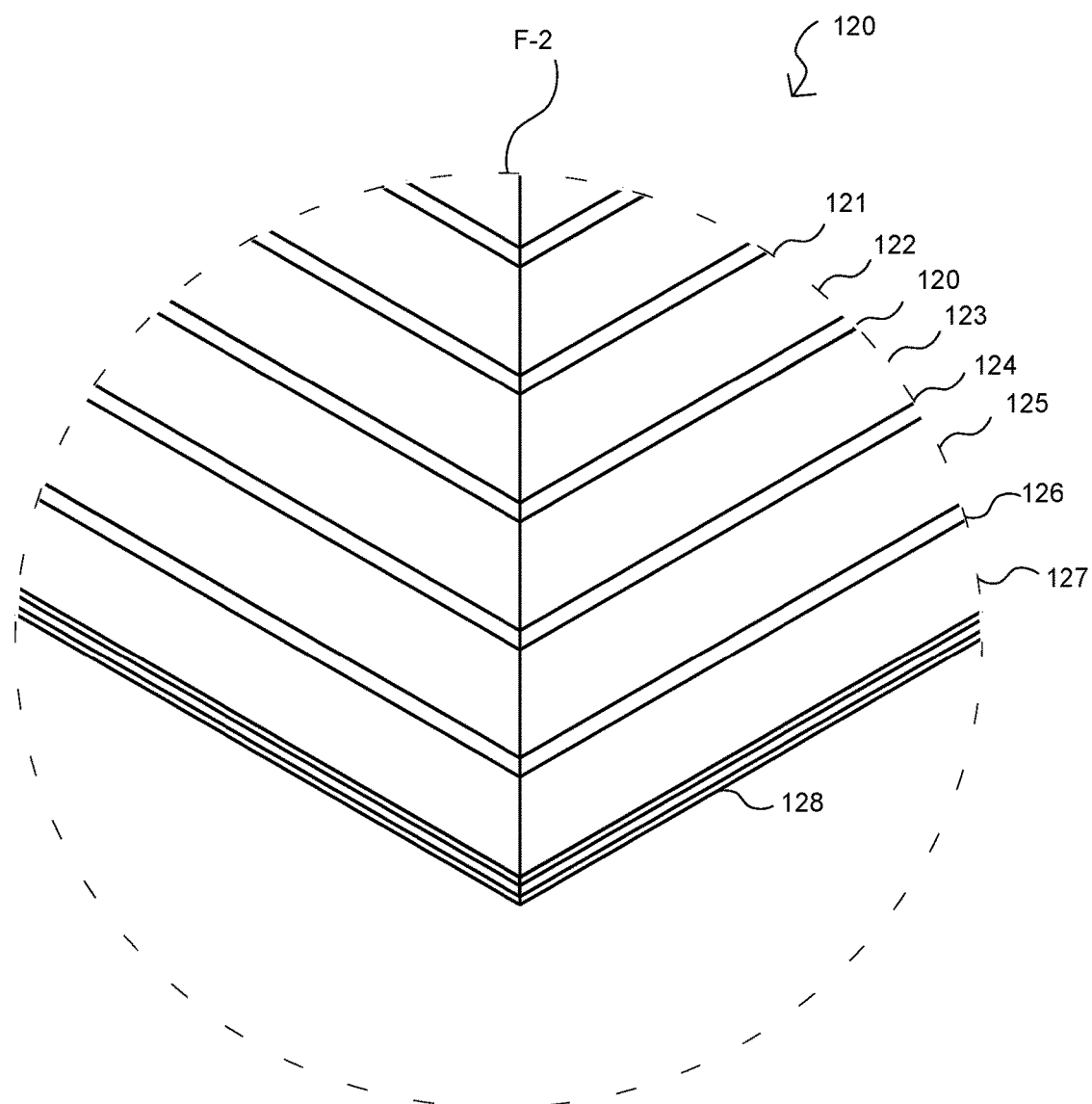
FIG. 2 is an enlarged view of the portion F-2 identified in FIG. 1.

A small portion of a vertice 108 is shown in FIG. 2 having a magnification and enlargement of 25×. In this embodiment, the side walls 104 of the tool 100 are comprised of multiple side walls 104 of the plurality of layers 120 which make up the tool 100. As shown here, the layers 120 may include a variety of different layers, organized in different orders, and comprising different patterns as discussed in greater detail with reference to FIGS. 6-13.

Figure 3:
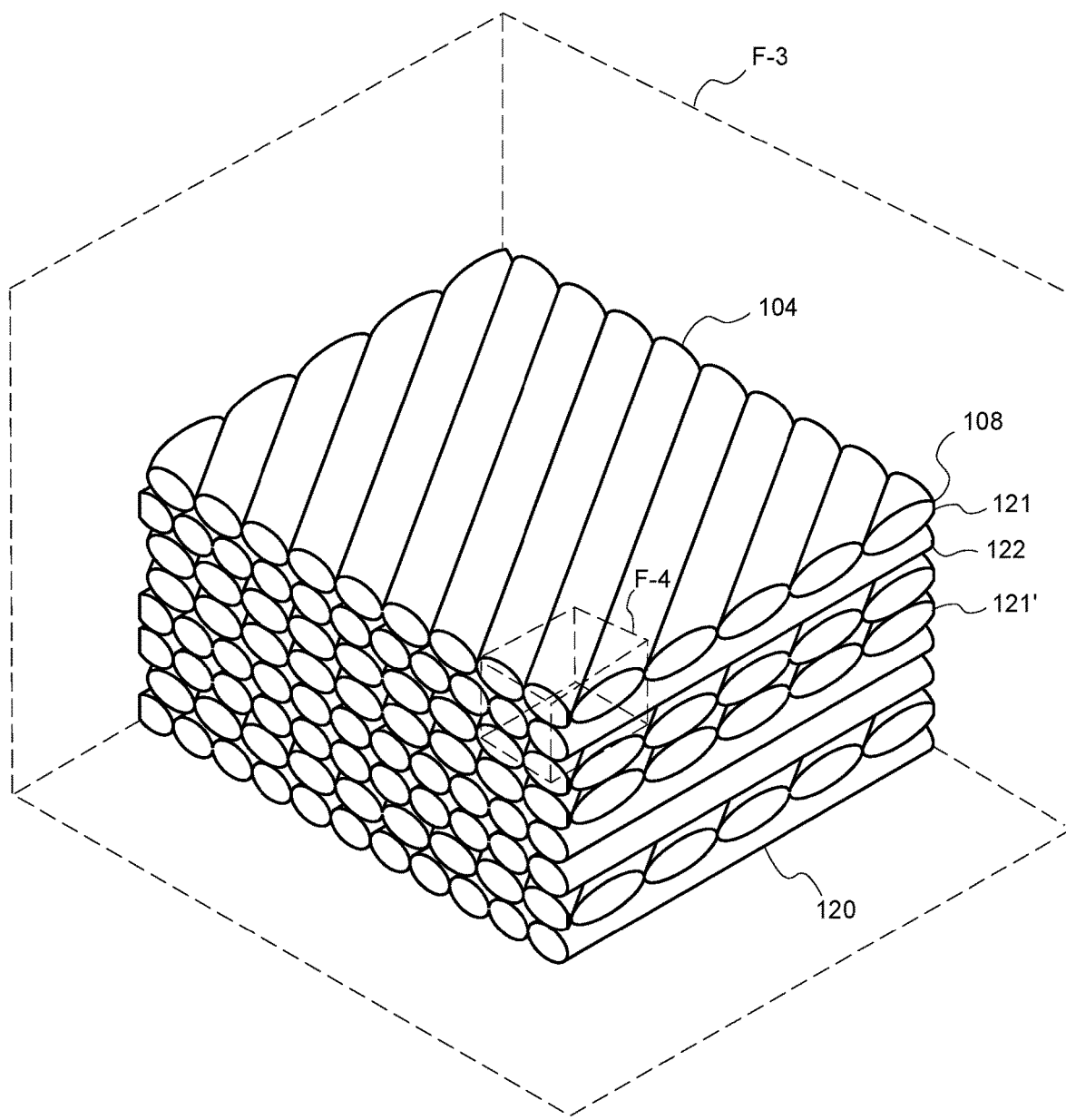
FIG. 3 is a further enlarged view of the portion F-3 as identified in FIG. 1.
Figure 4:
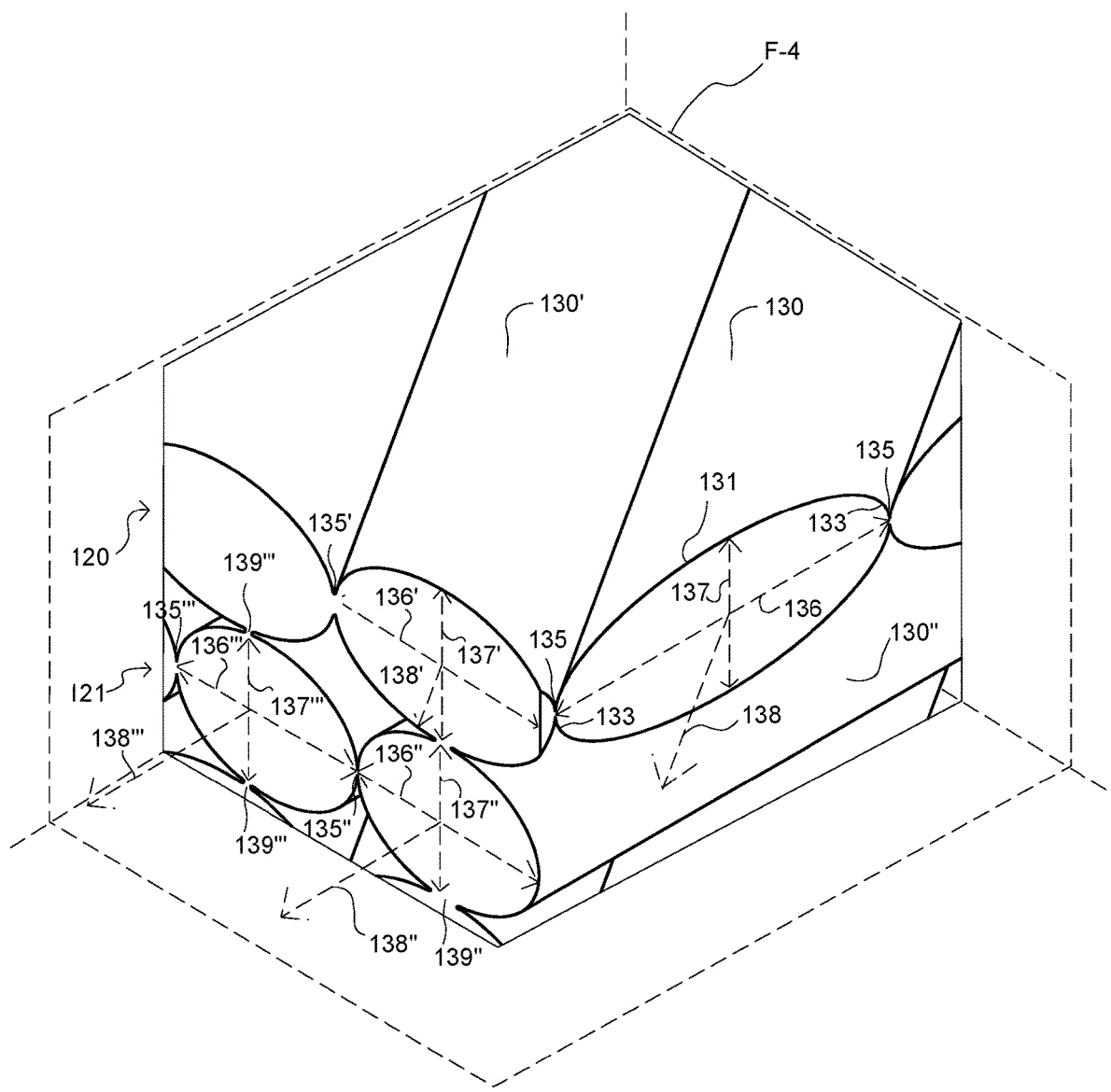
FIG. 4 is a further enlarged view of the portion F-4 as identified in FIG. 3.

A further enlargement of a smaller portion is shown at a magnification of 250× in FIG. 3 to illustrate the filaments which make up the layers 120 shown in FIG. 2. A yet further portion F-4 of FIG. 3 is further enlarged and magnified in FIG. 4, which illustrates the characteristics of the filaments 130, 130', 130'', 130''' of two distinct and adjacent layers 121, 122. On an upper layer 121, the filaments 130, 130' have a generally horizontally columnar shape with an internal axis 138, 138' which is parallel to a plane of the upper surface 102 of the tool 100, but angular to a plane of the sidewall 104 of the tool 100. Each filament 130, 130' of this layer 121 have parallel internal axis 138, 138' and equal middle ordinate distances 137 along the height of the apex of the main curves 131, 131'.

However, as the first filament 130 is cut tangentially along the sidewall 104 of the tool 100, the width 136 of the exposed surface along the major inclined tangent is proportionally longer than the width 136' of the exposed surface of the adjacent filament 130' along the minor inclined tangent.

Similarly, the various curvatures of the adjacent filaments likewise vary in degree. Specifically, the upper and lower main curvatures 131 extend along a main portion between upper and lower abutting curvatures 133 of the first filament 130. The upper and lower abutting curvatures 133 are exponential until each of the upper and lower abutting curvatures of the first filament meets and merges with opposing adjacent upper and lower abutting curvatures of an adjacent second filament 130'.

In this manner, each filament 130 merges with and becomes at least partially joined with each adjacent filament along this junction 135, 135'. That is, when first extruded next to one another, adjacent horizontal surfaces of the respective filaments 130, 130' abutted against one another until merging and forming a cohesive unit with curvatures 131, 133 along these junction points 135, as shown. This feature is enabled in this embodiment by using an abrasive ink which has a first state condition while being placed and a second state condition during use. Specifically, the filament thread is first flexible and malleable while being formed, and thereafter, the filament thread solidifies and maintains a stable shape.

In this embodiment the filaments 130', 130 of a first layer 120 of thread will partially merge and integrate with the filaments 130", 130''' of a second layer 121 of thread in a similar manner along conjunction points 139. These junctions 135 and conjunction points 139 together merge the filaments 130, 130', 130", 130''' along a vertical and horizontal manner. Thus, while a tool 100 is comprised of thousands of thousands of individual filaments 130, 130', 130", 130''', the tool 100 itself is yet integrated and wholly considered to be one singular object—and no longer separable into its' component parts 130, 130', 130", 130'''.

Composite Layers

Figure 5:
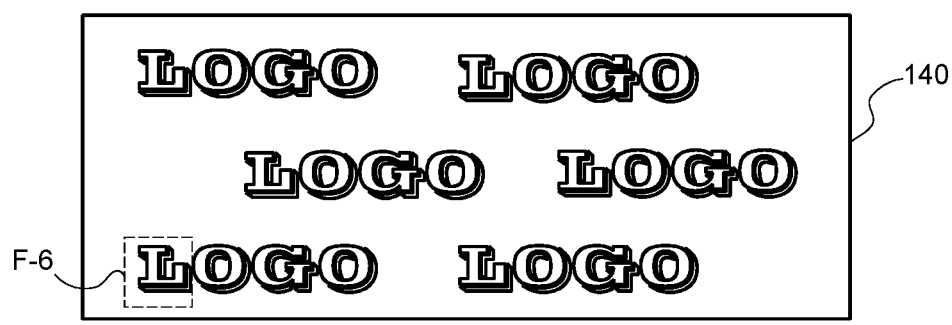
FIG. 5 is a top planar view of a composite layer according to one embodiment of the present invention.

Turning next to FIG. 5 which illustrates a top planar view of a composite layer 140 of a tool 100 according to one embodiment of the present invention. As shown in this layer, from a top planar view, the intricacies of a composite layer may not always be readily apparent to the naked eye. However, the disparate axis 148,148', of the threads of the overlayer 141 and each component layer 142 enable patterns to be visible to the naked eye along the perimeters of these adjacent layers.

Figure 6:
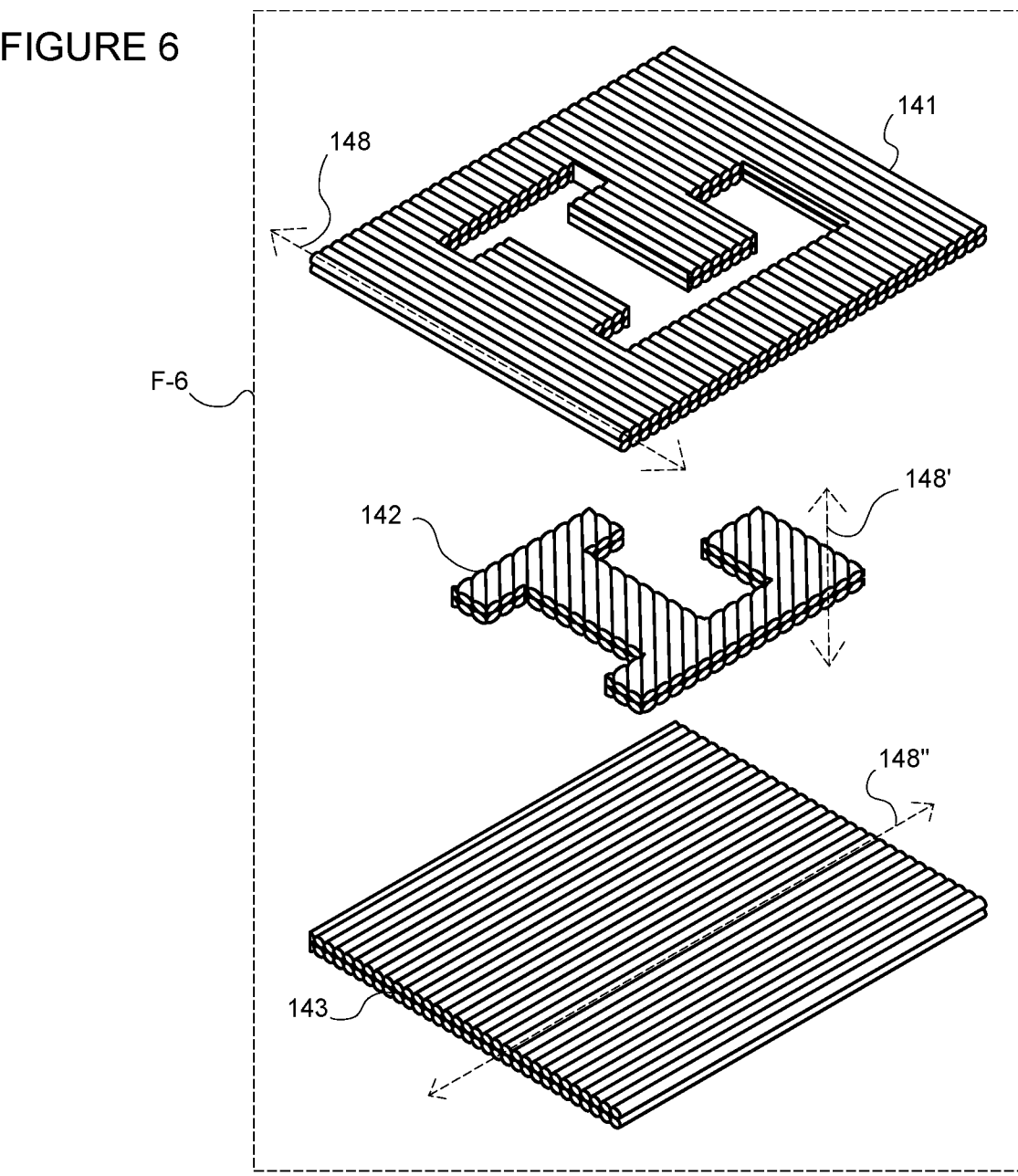
FIG. 6 is an exploded and enlarged view of the portion F-6 illustrating the layers making up the composite layer in FIG. 5.
Figure 7:
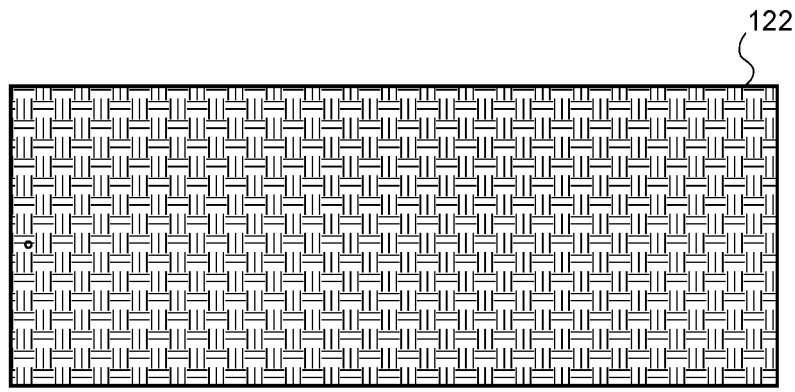
FIG. 7 is a top planar view of a layer according to one embodiment of the present invention.
Figure 8:
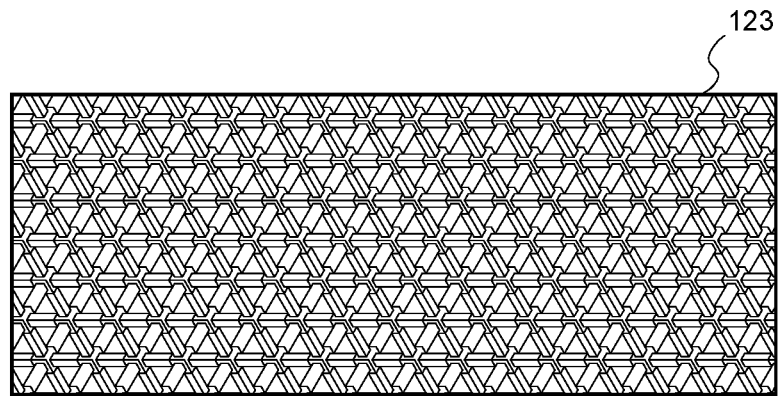
FIG. 8 is a top planar view of a layer according to one embodiment of the present invention.
Figure 9:
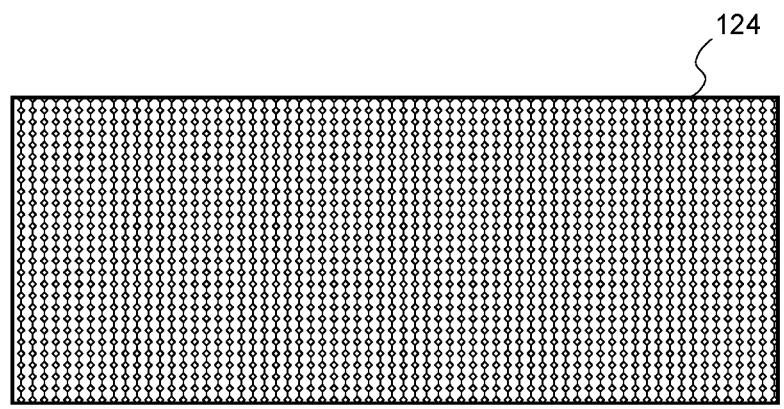
FIG. 9 is a top planar view of a layer according to one embodiment of the present invention.
Figure 10:
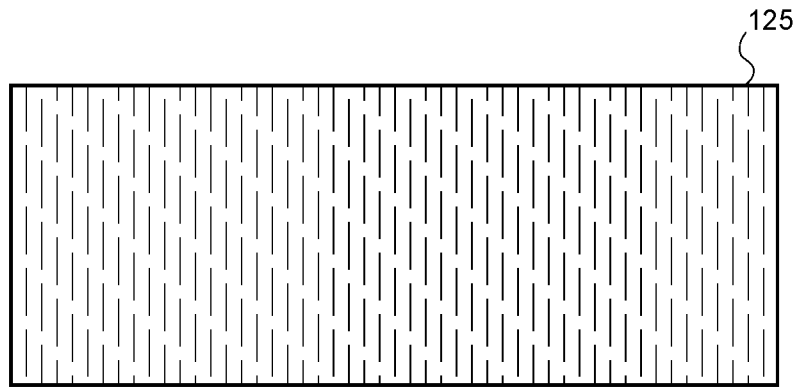
FIG. 10 is a top planar view of a layer according to one embodiment of the present invention.
Figure 11:
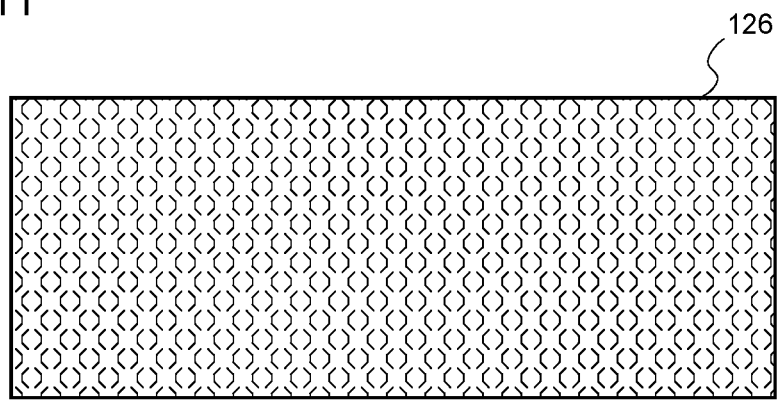
FIG. 11 is a top planar view of a layer according to one embodiment of the present invention.
Figure 12:
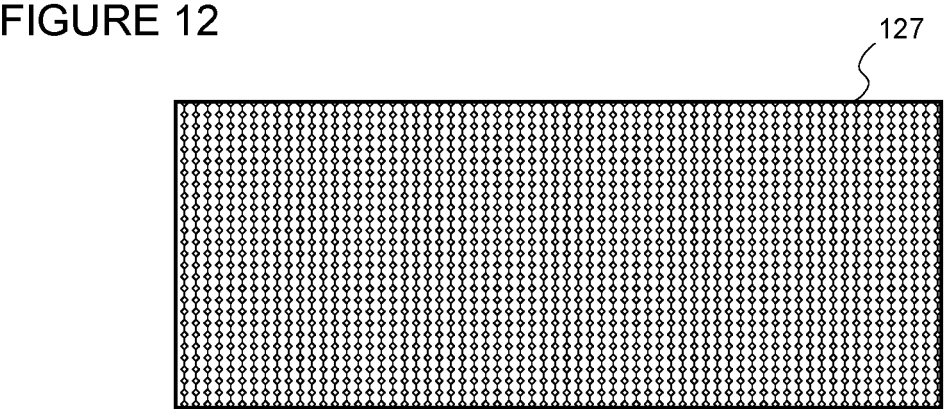
FIG. 12 is a top planar view of a layer according to one embodiment of the present invention.
Figure 13:
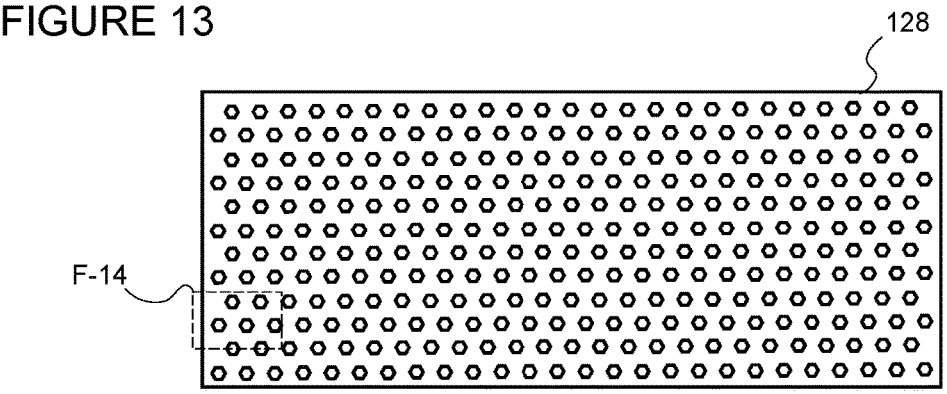
FIG. 13 is a top planar view of a layer according to one embodiment of the present invention.

Specifically, portion F-6 is further enlarged and exploded in FIG. 6 to illustrate the nature of such a composite layer 140. As seen here, the overlayer 141 has threads with a first internal axis 148 which is disparate to an internal axis 148' of the component layer 142. The base layer 143 may yet have threads with an internal axis 148" which is disparate from the internal axis 148, 148' of both of the threads of these layers.

Each of the base layer 143, the component layer 142, and the overlayer 141 have two vertical layers of threads per layer 141, 142, 143. However, it is to be understood that each of the base layer 143, the component layer 142, and the overlayer 141 may have multiple thread layers depending upon the desired height of the pattern 112 formed.

In some embodiments, the filaments of a first layer of thread will partially merge and integrate with the filaments of a second layer of thread so that while a tool 100 is comprised of thousands of thousands of individual filaments, the tool 100 itself is yet integrated and wholly considered to be one singular object—and no longer separable into its' component parts.

In other embodiments, the final sharpening apparatus has multiple components, a main component, and at least one (and sometimes several) subcomponents. The main component of these embodiment is similar to those discussed above in that filaments of a first layer of thread will partially merge and integrate with the filaments of a second layer of thread so that while the main portion of the tool 100 is comprised of thousands of thousands of individual filaments, the main portion of the tool 100 itself is yet integrated and wholly considered to be one singular object—and no longer separable into its' component parts.

However, the subcomponents are also made such that filaments of a first layer of thread will partially merge and integrate with the filaments of a second layer of thread so that while one of the subcomponents 129 of the tool 100 is comprised of thousands of thousands of individual filaments, the subcomponent 129 of the tool 100 itself is yet integrated and wholly considered to be one singular object—and no longer separable into its' component parts.

In these embodiments, such as shown in FIGS. 13-16, the subcomponents are reversibly interlocking and/or interactive with the main component of the tool 100 itself.

Methods of Making

This application is directed towards abrasive tools which can only be manufactured by additive construction methods using filaments 130. However, it is to be understood that the term filament 130 is used to refer to the general form of abrasive ink in general. It is to be understood that the abrasive ink can be formed in a filament form, wound filament form, pellet form, or powder form.

An abrasive ink which may be used to create a sharpening tool 100 according to the present invention preferably consists of a mixture of poly-lactic acid (PLA) with diamond, cubic boron nitride, zirconia, aluminum oxide, sapphire, etc. Particular abrasive inks according to the present invention are prepared in a carefully controlled mixture that can be used in an XYZ axis, computer-controlled extruder to construct the above described embedded structural matrices. The abrasive ink is then extruded using selective laser sintering (SLS), fused filament fabrication (FFF), or other metal 3-D printing methods to create matching lapping and dressing forms of a sharpening tool 100.

Currently FFF and SLS are generally considered separate technologies but according to the present inventive methods, lasers have been found to be capable of being added to FFF printers to allow selective sintering and light curing during FFF and pellet extrusion. This enables selective sintering and curing of structures within a matrix. According to the present inventive method, this facilitates the creation of highly controlled matrices that do not break down under light-wear, but instead allow for highly controlled "friability" (the rate at which abrasive particles break away under load).

Using multiple heads on an FFF printer, the present method provides methods for laying down uncured soft abrasive ink filaments next to light curable filament or sinter-able ink, filaments, pellets, or powder. Thereby creating hard and soft or flexible and rigid structures in any combination required.

Additional Embodiments

Flexible and Rigid Structures

Generally, knife sharpening is done with rigid abrasive blocks tool both natural and synthetic. There are situations however where flexible abrasives are useful. For instance, some knife bevels have a curve in the face or bevel leading to the edge. This is called a "cheek". The cheek can be convex or concave. By mixing thermoplastic elastomers (TPU) with diamond and or other abrasives, the present inventive method extrudes a flexible filament that will take on the form of the cheek of a blade curved or straight. Further, the inventor can fabricate a 3d structure like a keyway. This is like an eraser that can be pulled over the edge of a knife. Importantly, it can turn corners due to its elasticity.

This is useful for deburring as well as sharpening and polishing. A good example is sharpening and de-burring the knives in a paper printer's template. The "eraser sharpener" can be used manually or at the end of a robotic arm. The "slot" in the "eraser" can be a simple cut or a more complex opening that polishes the surface behind an edge or corner with actually contacting the edge or corner. Importantly, the inside surface of these eraser abrasives can be "lined" with rigid, semi rigid or flexible and pliable abrasive filament wall while the rest of the structure is fully flexible TPU. Or the inverse, abridged structure with a pliable wall lining. That is, a thin layer of woven abrasive backed by a unidirectionally flexible structure or the inverse.

Diamond Adhesive

PLA infused with very small (0.1-10 micron) diamond is an extraordinary adhesive because PLA expands as it takes on water which increases its adhesive characteristics. The very small embedded diamonds lock onto the material's own surface structure as it expands. When using this present inventive method, these PLA filaments are dried very carefully before extruding it, so it is applied in its smallest volume. Then, as the filaments begin to take in water from the atmosphere, the filaments begin to expand again.

This expansion pushes against roughness of the surface topology it is being adhered to, locking it to a surface. The strength of the bond is so efficient that it tears away the surface of glass it is adhered to on removal. The present methods have found excellent binding capacity for each of aluminum, steel, stainless steel, plastic and wood. The adhesive properties of diamond/PLA mixture are important because the filament can be deposed directly to substrates such as glass and aluminum.

This inventive FFF technique has also been successful in binding our abrasives directly to flat and curved glass and aluminum substrates without any secondary glue applied between in the process. In fact, the present inventive abrasive filament can be used as a base layer for any kind of 3d abrasive tool printing that is intended to stick to a substrate base.

The preferred size of diamond is 10-1800 microns, while for the abrasive structure, the preferable size of diamond is less than 2 microns when being used in a binding layer to the substrate. The adhesive layer is melted into a surface at the PLA melting point between 190° C. and about 280° C. and thereby creates a strong bond.

Specifically, during the manufacturing process, the print head melts the material as it extrudes. If the cooling fan is turned off for the first layer, the material stays hot a little longer and flows into the pours of the substrate. Because the PLA has been dried before extrusion, it is in its most compact state. The melting heat then causes some expansion but it is not enough to keep the material from flowing into the pores of the substrate.

The hydrophilic nature of the PLA causes the material to expand as it takes on moisture from the atmosphere. This expansion locks the extrusion to the substrate increasing the strength of the bond. The present inventive technique employs a very small diamond—one that is smaller than the openings in the surface of the substrate. This technique will work on glass, aluminum, plastics, stainless steel, iron, titanium and especially any graphene structure. Using multiple print heads, first adhesion layers may be alternated with further abrasive layers of any size because the diamond crosslink adheres to itself with the same properties.

For example, a 1-micron adhesion layer may be laid down and then followed with a 10-micron abrasive layer. The 1-micron layer grabs the substrate underneath and the 10-micron layer above and holds everything together permanently. So, as the material cools and takes on moisture, it expands and interlocks with increased strength throughout the matrix, both above and below.

Dressing or Lapping

Dressing and lapping are integral to abrasive structures. As we sharpen, polish and de-burr, we deform the surface of the abrasive and the surface gets impacted with material from the object being sharpened, polished and de-burred. Therefore, it is necessary to reform and clean out the surface of the abrasive periodically. Additive manufacturing affords us the opportunity to create lapping and dressing plates that are the inverse of the shape of the foundation abrasive. For example, a curved tool used to sharpen the inside of a scissor.

The base abrasive for such an embodiment could be from 0.1-300 microns. The inverse lapping plate can be an exact surface match to the base abrasive but have a correspondingly larger abrasive to overcome the base abrasive. Thereby reshaping and cleaning the base abrasive. Such an embodiment may be referred to as "matched abrasive forms".

Figure 14:
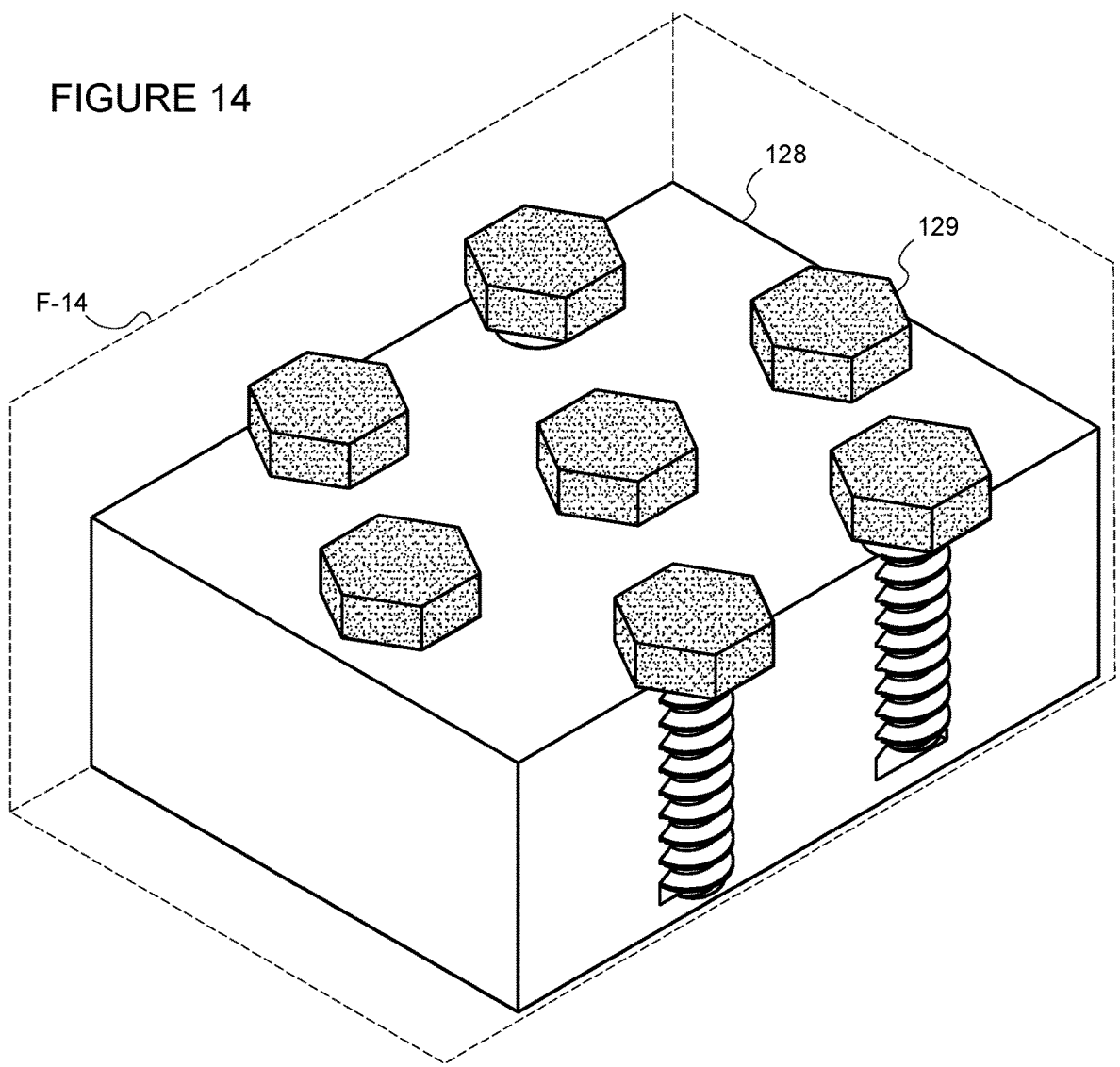
FIG. 14 is an enlarged cross-sectional view of portion F-14 as indicated in FIG. 13.
Figure 15:
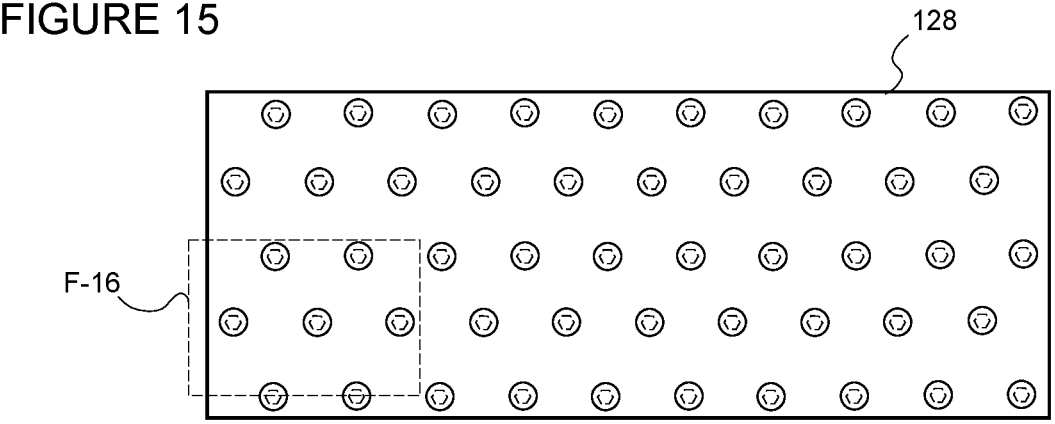
FIG. 15 is a top planar view of a layer according to one embodiment of the present invention.
Figure 16:
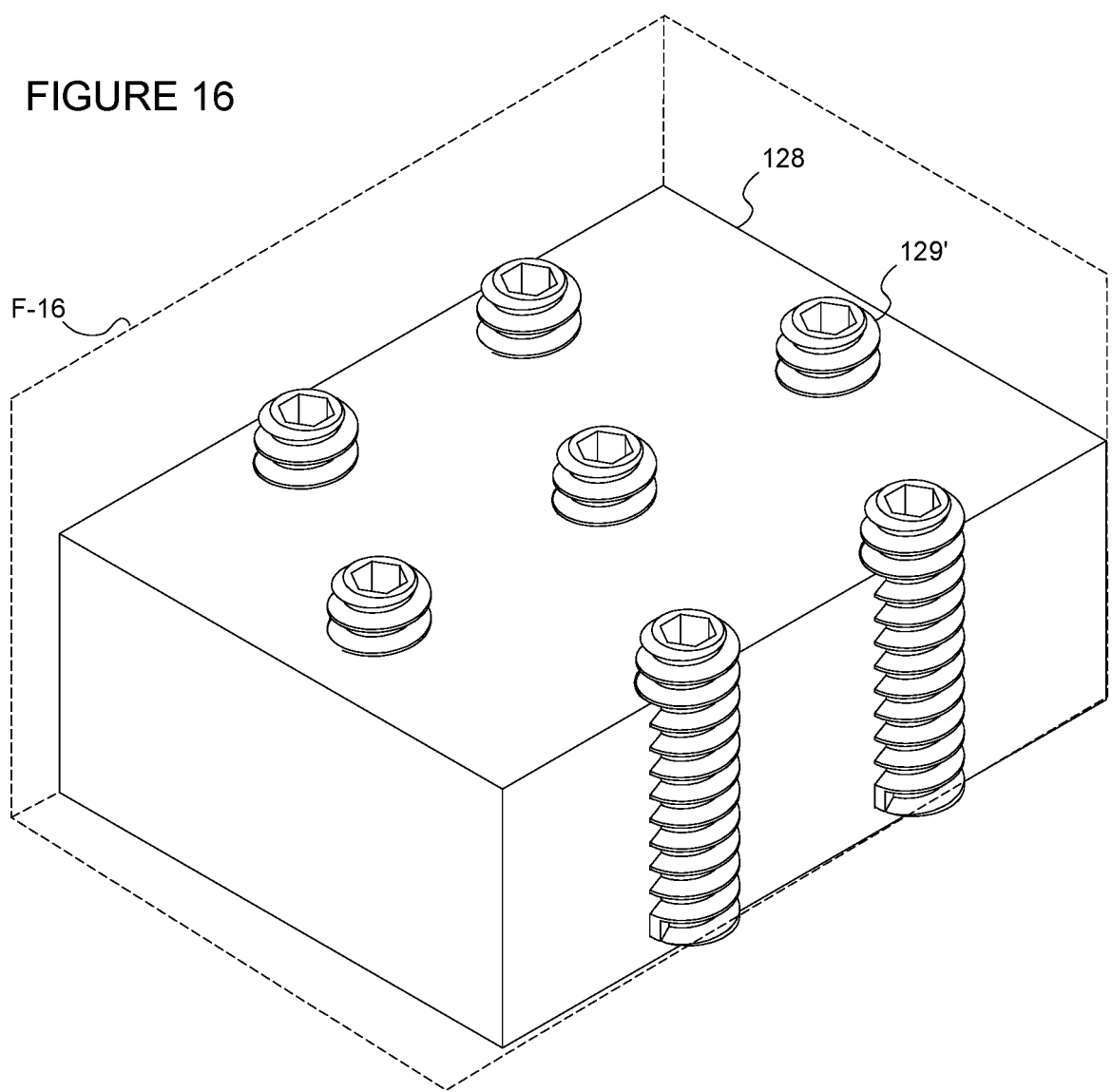
FIG. 16 is an enlarged cross-sectional view of portion F-16 as indicated in FIG. 15.

For flat surfaces, the present invention has another embodiment made possible by additive manufacturing, threaded abrasive buttons, such as shown in FIG. 14. These are basically screws made out of abrasive ink according to the above inventive method. The abrasive ink can vary over the length or height of the screw, from abrasive structure to machinable material.

Once diamond metal screws of the prior art are sintered, they are virtually un-machinable. Unlike the prior art, using the present inventive methods, the head of the screw is a machinable material. The screws are very useful because they can be adjusted from either end to meet the surface that needs to be lapped or dressed. This can be used on large lapping machines to make height adjustable, interchangeable grinding pins. Currently industry replaces entire lapping plates on these machines. these replaceable threaded buttons would be easier to replace and adjust to common height or variable height to lapp non-uniform shapes as described above.

In yet another embodiment, matched abrasive forms can be combined with adjustable grinding pins to grind adjustable surface features by hand power or machine power. Note the head shape of the threaded abrasive pins can be round, flat or pointed. They can have slots for in out adjustment or holes in the side of the pins for adjustment and they can be locked in place with threaded locking rings or secured with breakable thread lock or both.

Round heads are appropriate for curved surface shapes as the contact point will be the top of the dome of the screw. This ensures an increased lifetime, as over time, the top of the dome will wear to match the shape of the surface it is lapping, dressing or polishing (instead of the prior art). These grinding pins can be made using very soft, even flexible abrasive material in an FFF process for precision polishing of delicate surfaces like silicon wafers. The star-and-hexagon pattern is an excellent example of a custom abrasive screw. The screw heads can be star shaped and hexagon shaped increasing the number of edges that work the abrasive surface.

Lap-Ability

Most diamond resin abrasives currently available are designed industrial high heat applications. The result is that these are very hard compounds, and they are difficult to dress. One of the main concepts the present inventive methods seeks to address is increased control over hardness and wear by manipulating carefully deposited layers of abrasive material. For industrial purposes, "dressing layers" are possible according to the present method.

One embodiment according to this method to would be a color-coded layer that disintegrates leaving a dressed flat surface to work on. For instance, a round grind tool would be printed in layers like the tread of a car tire, then, interval layers of soft material protecting newly dressed hard layers. The soft layer is strong enough to bind the tool together but soft enough to go away quickly revealing the new surface. This is a self-dressing tool saving lots of manufacturing time.

The same concept is applicable to hand sharpening tools that need be much softer than industrial resins and don't have the heat requirements. Using PLA and diamond or any of the "group" of abrasives and no curing process, the present method can make a "soft diamond abrasive" that is lap-able by hand using the hardened lapping plates described here. It can also have "self-dressing layers". Combining the two hard/soft, cured, uncured concepts makes for very effective abrasives. Bedding cured abrasive in uncured abrasive using selective curing allows us to create effective cutting matrices that can be interspersed with self-dressing layers.

Personalization and Leveling Indicators

Extruding filament in extremely thin layers is possible with FFF and SLS. This affords opportunities to mix layer heights. For example, with the present inventive method a structural abrasive can be laid down with 0.1 mm layers and every 3 layers, put down a 0.01 mm layer in a different color and vary the color within the thin layers. This thin layer can have "X" marks in specific spots around the layer surface. These are leveling indicators. As the abrasive structure wears from use, lapping and dressing, these indicator marks help the user/operator judge the evenness of the wear or, the wear patterns.

These marks or a special color layer can indicate the end of the life of the abrasive. These layers can be used in a rectangular abrasive block or a round abrasive wheel. When the red layer come up, the abrasive is worn out. The same is true for personalization of abrasive products. The present inventive layering technique facilitates personalization of an abrasive with any written phrase like "we love you dad" or a company logo that shows up in every layer through the abrasive structure.

Variable Density and Grain Size

By utilizing multiple filament extruders on a machine, the present method may introduce variable densities and grain sizes. The abrasive can then be made that starts out coarse and gets finer with each layer. This is useful when sharpening stainless steel where the outer layer of the steel is protected by a chromium oxide layer that needs to be broken before the underlying metal can be sharpened to a fine edge.

One example of this is a 2-layer abrasive strip with a sticky (PSA) back. The first layer will break the aluminum oxide layer of the steel and the second layer will sharpen the steel. An even finer third layer can be introduced as well for finishing.

A further embodiment introduces the concept of timed release. For example, in this embodiment a disintegration time is determined, and the layers are built accordingly. For a layer that is determined to disintegrate in 3 minutes with 60 pounds of pressure at 54 RPM, a 3-layer abrasive is built that degrades in 9 minutes, going from coarse to fine over three steps. Thus, this embodiment provides multiple layers in a single sharpening tool enabling a lapping or polishing process to be completed in a single operation.

Sharpening, Polishing and Deburring Shapes

Clipper blade sharpening is an excellent example of an industry that will benefit from abrasive tool manufacturing according to the present method. Current prior art sharpeners mix lard with abrasive to charge the surface of a cone shaped plate that spins. It is messy and inaccurate. It requires lots of operator experience to get even somewhat adequate results. By laying down a few layers of diamond PLA according to the present invention, over the surface of their cone shaped plates, most of the mess will be eliminated. Using the adhesion described above and depositing a few layers of material, the sharpener could work on a far cleaner and more accurate surface.

Further, an inverse Lapping/dressing plate can also be made to fit the user's own machine surface using a laser scanner. Scan the plate surface to create a 3D image and print a matching lapping plate as described above. This operation can be executed for and number of grinding machines. Custom dressing plates will increase productivity in any grinding opposition.

Food Safety

PLA is readily available as a food safe material. Using PLA as a basic binder for abrasives makes it possible for us to manufacture food safe sharpening tools. Currently there are no food safe sharpening tools. Cooks should be made aware that many sharpening tools on the market have numerous undisclosed chemicals in them that do not belong in food. The FDA considers aluminum oxide powder to be safe to ingest in small quantities and safe for use in makeup. So, a food safe sharpening tool made of aluminum oxide and PLA is a useful product for commercial kitchens. Other abrasive minerals may also qualify for a lower level 3 of non-contact food safety.

Filament Abrasive Ink

Abrasive ink may be manufactured in any grit from 120 microns down to 0.1 microns starting with PLA with diamond, aluminum oxide, zirconia, sapphire and virtually abrasive material. Alternatively, TPU flexible abrasives may also be used for the abrasive ink of the present invention. The present inventive method has successfully made thin (900μ) flexible sheets with the same process.

Diamonds have lots of facets and fine diamond powder between $0.1\mu$-$100\mu$ is also a really sticky powder. Combining diamond powder with PLA, another adhesive material, creates a comparatively soft abrasive material. The diamonds act as a cross linking monomer and the PLA is so soft that it will release the diamonds when merely lapped. This would lead to the release of diamonds upon wearing so that lapping one diamond with another is ineffective.

Indeed, the ink of diamond crosslinked PLA results in a stiffer material than PLA alone. As best reviewed by experts in the field it appears that the crosslinking according to the present inventive method is unlikely to be chemical in nature but instead appears to be an unexpected result of entanglement which occurs due to the inventive methods of employing multiple weaving layering as described above.

The toughening of the PLA with the crosslinking diamond according to embodiments of the present invention enable the creation of solid, flexible sheets of "diamond resin sand paper". These are flexible sheets of diamond and PLA with a cross hatched surface. One embodiment of the present invention is from 100-1000 microns in thickness and can include any diamond size from 0.01 microns to 1800 microns.

According to this method, the wear and release of the diamond can be controlled to some extent by the pattern in the surface. A wider, more open pattern with narrow features in further layers will wear and release quicker and a tighter weave with thicker features will release more slowly. This is a big advantage of the 3D FFF printing of abrasive materials according the present invention.

The binder in the abrasive has to be much softer than the binder in the lapping dressing plate. The combination of sintered diamond/metal toothed lapping plate with a soft PLA binder in the abrasive structure is very effective. The lapping plate can "kick" the diamonds out of the surface of the PLA abrasive structure. This concept can be carried further by interspersing abrasive filament with nonabrasive filament. Not only does this balance improve dressing and lapping characteristics but it makes for more effective abrasion of material surfaces because abrasive edges are more effective than abrasive surfaces.

Hard structures enmeshed in soft structures are far more effective than smooth flat hard surfaces. Embedded hard structures work particularly well for sharpening, the comparatively soft areas are strong enough to keep the knife from diving into the gaps between the hard structures. At the same time, the interspersed abrasive structure is providing the increased abrasive edges for maximum.

Creating these hard and soft structures is a matter extruding filament with varying concentrations of abrasive material. That is to say a multiple head extruder lays down a low concentration or no concentration filler, a second head extruder comes in and lays down an interlocking high concentration filament possibility followed by a third extruder head with a colored (pigmented) filament. This process repeats again and again building horizontal (XY axis) and vertical (z axis) structures. The vertical structures can be grown straight up or at an angle to give the abrasive structural direction, and the same is true for round abrasive wheels.

Another embodiment is a "paddle wheel" structure within a wheel. This is similar to a traditional 'flap wheel except the flaps are suspended in filler material that has little or no abrasive content. Self-dressing layers as described above can be included in this embodiment. As described above, these wheels and structures can be very pliable or very firm as the application requires. Because the "paddles" are suspended in filler, abrasion in/out and contour action control is far superior to an unsupported flap wheel. The interspersed structures can also be reinforced with nylon and/or ABS which can also be extruded from pellets or filament. Most known abrasive compounds can be used with this system.

Filament Manufacturing

The first step in manufacturing a filament according to the present invention is to obtain an appropriate abrasive component. Abrasive components which are suitable include industrial microparticles of diamond, cubic boron nitride, zirconia, aluminum oxide, sapphire, silicon carbide, and garnet. The size of these abrasive components which are suitable range from 250 microns to 0.01 microns.

The second step is to provide a substrate base which is capable of adhering to and containing the abrasive components, such as pulverized PLA. This substrate is then mixed with the industrial particles to form a consistent mixture. Mixtures which have been successfully created according to the present inventive methods have a diamond content ranging from 0.1% to 90% of industrial particles. Generally, the present invention employs a mixture having 25% industrial diamond particles.

After the mixture is thoroughly consistent, the mixture is dried in an oven for several hours to remove as much moisture as possible. Preferably, the moisture content is reduced by between 5-50%, and more preferably, by at least 20%. After drying the material, the hopper on a commercial extruder is filled.

Next, the material is extruded into a very consistent filament which is typically between 1.5-3 mm in diameter, and more preferably, about 1.75 mm in diameter. As the material is extruded, it is coiled onto a spool to keep the filament threads untangled.

Once the abrasive filament is wound on a spool, the spool is then ready to be hung on a commercially available 3D printer. The filament is then fed through the melting nozzle on the head of the 3D printer.

Before the operating program of the 3D-printer can begin however, the present inventive method requires that the printer be programmed with an abrasive structural design. After designing the abrasive structural design, and loading the filament spool, the 3D printer can then begin printing the design using the abrasive filament. The present inventive method has successfully been used to print solid designs and honeycomb designs in this manner.

Because of the layering nature of this kind of printing, this method facilitates intertwining multiple abrasive filaments into a single design. Other embodiments and layers employ alternating soft and hard abrasives (diamond and aluminum oxide for example) creating specific textures in the surface of each respective layer. Then during use, the tool being sharpened gets abraded with the abrasive structure per design.

This method also facilitates the use of layers having alternating colors as well creating personalized abrasive products that reveal new script as the layers wear away to create greater personalization. Other embodiments employ embedded wear guide marks into the layers. This allows the user to judge whether the abrasive is wearing evenly or not. If not, the user can adjust her pressure application to bring the abrasive surface back into a balanced wear pattern using the wear indicators as a guide.

One of the most important aspects of this filament design and production method is the ability to make a softer diamond binder. Most diamond resin products on the market are built by spraying a diamond resin onto a substrate like aluminum. However, the present invention overcomes the failures of these prior art substrates and resins which are way too hard for hand sharpening and polishing methods.

Contrary to the prior art, the present inventive filament is very soft by comparison. The advantage of this softer diamond resin is that it is much easier to lap. When lapping diamond resin, the inventor has learned that it is not possible to actually flatten the surface of the individual diamonds in the surface of the diamond layers. Rather you have to "kick" the diamonds out of the resin in order to shape the surface of the resin. The softer diamond resin according to the present invention releases the diamonds more easily, making it possible to reshape the abrasive surface more easily than current products on the market. This is particularly helpful for hand sharpening and hand lapping procedures.

CONCLUSION

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:
1. A three dimensionally printed sharpening tool comprising:
   a first layer formed of a first plurality of filaments, each of the first plurality of filaments having a vertically facing surface and an horizontally facing surface, at least a portion of the horizontally facing surfaces of each of the first plurality of filaments abutting against, and at least partially merging with, at least a portion of the horizontally facing surfaces of at least one other of the first plurality of filaments; and a second layer formed of a second plurality of filaments, each of the second plurality of filaments having a vertically facing surface and an horizontally facing surface, at least a portion of the horizontally facing surfaces of each of the second plurality of filaments abutting against, and at least partially merging with, at least a portion of the horizontally facing surfaces of at least one other of the second plurality of filaments;

wherein at least a portion of the vertically facing surfaces of each of the first plurality of filaments abutting against, and at least partially merging with, at least a portion of the vertically facing surfaces of at least one of the second plurality of filaments; and wherein the first plurality of filaments formed of a composite mixture of at least one of poly-lactic acid and thermoplastic elastomer, with at least one of an abrasive component, the abrasive component being chosen from the group consisting of diamond, cubic boron nitride, zirconia, aluminum oxide, sapphire, silicon carbide, and garnet.

2. The three dimensionally printed sharpening tool of claim 1 further comprising at least one composite layer having at least one base layer, at least one component layer, and at least one overlayer.

3. The three dimensionally printed sharpening tool of claim 2 wherein the at least one component layer and the at least one overlayer interacting vertically and horizontally, having complimentary shapes.

4. The three dimensionally printed sharpening tool of claim 3, wherein the at least one component layer further comprising threaded grinding pins, and wherein the at least one overlayer further comprising threaded apertures which threadingly engage the threaded grinding pins.

5. The three dimensionally printed sharpening tool of claim 3, wherein the at least one composite layer comprising leveling indicators; the at least one component layer further comprising a shape designed to provide a personalized label of a first color; and wherein the at least one overlayer further comprising a complimentary shape having a second color.

6. A method of three-dimensionally printing a sharpening tool comprising:

extruding an abrasive ink with at least one of an abrasive component, the abrasive component being chosen from the group consisting of diamond, cubic boron nitride, zirconia, aluminum oxide, sapphire, silicon carbide, and garnet;

forming a first layer of a first plurality of filaments with the extruded abrasive ink, each of the first plurality of filaments having a vertically facing surface and an horizontally facing surface, at least a portion of the horizontally facing surfaces of each of the first plurality of filaments abutting against, and at least partially merging with, at least a portion of the horizontally facing surfaces of at least one other of the first plurality of filaments; and laying down a second layer formed of a second plurality of filaments, each of the second plurality of filaments having a vertically facing surface and an horizontally facing surface, at least a portion of the horizontally facing surfaces of each of the second plurality of filaments abutting against, and at least partially merging with, at least a portion of the horizontally facing surfaces of at least one other of the second plurality of filaments; and wherein at least a portion of the vertically facing surfaces of each of the first plurality of filaments abutting against, and at least partially merging with, at least a portion of the vertically facing surfaces of at least one of the second plurality of filaments.

7. The method of three-dimensionally printing a sharpening tool of claim 6, further comprising forming at least one composite layer having at least one base layer, at least one component layer, and at least one overlayer.

8. The method of three-dimensionally printing a sharpening tool of claim 7, wherein the at least one component layer and the at least one overlayer interacting vertically and horizontally, having complimentary shapes.

9. The method of three-dimensionally printing a sharpening tool of claim 8, wherein the at least one component layer further comprising threaded grinding pins, and wherein the at least one overlayer further comprising threaded apertures which threadingly engage the threaded grinding pins.

10. The method of three-dimensionally printing a sharpening tool of claim 8, wherein the at least one composite layer comprising leveling indicators; the at least one component layer further comprising a shape designed to provide a personalized label of a first color; and wherein the at least one overlayer further comprising a complimentary shape having a second color.

* * * * *